INVENTORS
David Kaufman
George W. Lower

April 24, 1956     D. KAUFMAN ET AL     2,743,154
METHOD OF RECOVERY OF URANIUM BY A RESIN-IN-PULP PROCESS
Filed July 6, 1954     4 Sheets-Sheet 3

INVENTORS
David Kaufman
George W. Lower

BY *Roland O. Anderson*
ATTORNEY

April 24, 1956  D. KAUFMAN ET AL  2,743,154
METHOD OF RECOVERY OF URANIUM BY A RESIN-IN-PULP PROCESS
Filed July 6, 1954  4 Sheets-Sheet 4

INVENTORS
David Kaufman
George W. Lower

BY Roland C. Anderson
ATTORNEY

United States Patent Office 2,743,154
Patented Apr. 24, 1956

2,743,154

METHOD OF RECOVERY OF URANIUM BY A RESIN-IN-PULP PROCESS

David Kaufman, Winchester, and George W. Lower, Lexington, Mass., assignors, by mesne assignments, to the United States of America as represented by the United States Atomic Energy Commission Application July 6, 1954, Serial No. 441,692

7 Claims. (Cl. 23—14.5)

This invention relates to an improved process of recovering uranium values and more particularly an improvement in the so-called resin-in-pulp process.

It is common practice to leach uranium ores, such as for example tailings from South African gold mining, with sulfuric acid and to remove the uranium by passing the leach liquor through columns containing suitable ion exchange resins, which take out a complex uranium anion. When the resin has taken out as much as it can, an eluting liquid is then passed through, removing the uranium values and regenerating the ion exchange resin, which is then used to treat further amounts of leach liquor. This process, which has been used on a commercial scale, has certain drawbacks. The uranium ores are usually quite low grade, and the leach liquor has to be separated from a very large amount of ore solids. As a result there is a large filtration problem which adds markedly to the cost. The resin-packed columns also represent a relatively expensive construction which further increases plant fixed charges.

It has been proposed to eliminate the filtration step by exposing the leached ore pulp to resin in the form of moderately coarse particles, which are sometimes referred to as beads and then separating the beads with their content of fixed complex uranium anion from the ore solids in the pulp. This process is often referred to as the resin-in-pulp process. Despite the theoretical advantages presented by the elimination of the filtration step, the process presents very real engineering problems which are of a sizing nature because it is necessary to separate the relatively coarse particles from the fine ore solids in the pulp. Economic time cycles require a large surface area of beads, which means that although they are coarser than the ore solids themselves, they are still comparatively small, for example the beads may be +20 mesh, whereas the pulp particles are very much finer. In the case of gold tailings maximum pulp particle size is determined by the fineness of grind used in the original cyanidation process. It is common to effect a sand-slime separation, and the finest particle sizes are determined by the size at which the separation is made.

The sizing operation involved in the resin-in-pulp procedure is normally of a wet screening nature, and there is a serious tendency for the screens to blind because the presence of the coarser beads in the fine ore particles tends to pack and form a cake which bridges over the screen openings. The problem constitutes the principal practical operating disadvantage of the process.

According to the present invention the problem is very simply solved by a series of cells separated by vertical screens, which preferably are at least two mesh sizes finer than the beads and at least two mesh sizes coarser than the pulp particles. The screens may be vertical or slightly inclined so long as they would make a relatively small angle with the normal. In other words, the angle that the screen makes with the horizontal should be sufficiently large that the vertical component is much greater than the horizontal. There is then directed across the screen from bottom to top a fairly rapid flow of air bubbles which can be introduced by a suitable perforated pipe. This produces fairly violent agitation at the screen surface which keeps it from blinding; and at the same time, as far as the cell compartment in which the resin and leached pulp are in contact is concerned, a gentle circulation of the whole mass takes place, promoting a maximum rate of fixation of uranium on the resin.

A series of cells are preferably used, the first cell which encounters fresh resin pulp having the most nearly exhausted resin, and successive cells having more and more fresh resin, the resin in the last cell being entirely fresh. A countercurrent ion exchange is thus effected, which permits maximum fixation rates with maximum recoveries. When the resin in the head of the line has been completely loaded with uranium ion, this cell is cut out of the string, and a cell with fresh resin introduced at the end.

It is possible to remove the beads and elute them in any desired equipment, but it is an advantage of the present invention in a more specific aspect that the elution can be effected in the cell itself, the eluting liquid passing through a series of cells with the fresh eluting liquid striking the cell with the most nearly regenerated resin and finally contacting the resin with maximum uranium content. A very effective countercurrent elution is thus made possible.

Combined absorption and elution can be developed in a continuous process using a series of cells. There are two ways in which the cycle can be changed when resin has become completely charged with uranium in the adsorption cycle or substantially completely eluted in the elution cycle. In one modification the feed of pulp and of eluting liquid and the discharge of barren pulp and pregnant eluent can be shifted from cell to cell as the resin becomes completely charged with uranium or completely eluted. This presents the advantage of maintaining the resin content of the series of cells but requires a much more extensive piping and also requires more supervision because the inflow of pulp and eluent and the outflow of barren pulp and pregnant eluent must be changed at the proper intervals. Another method which proceeds automatically without the necessity of skilled attention is one in which a portion of the resin from each cell is removed, drained, washed and fed back to the preceding cell. In other words, in such a system the resin slowly moves countercurrently to the pulp in the adsorption cycle and the eluent in the eluting cycle. The saving in the supervision is partly offset by the higher cost of equipment since it is necessary to provide each cell with mechanism which will feed back drained and washed resin to the preceding cell. The means by which this countercurrent flow of resin is effected is not a particular part of the present invention as any suitable device may be used such as partly submerged screws, mechanical drags and the like. It is also possible to use reverse air lifts, but this is less desirable, as a very close adjustment of the discharge is necessary in order to keep the total amount of resin in each cell constant.

The process of the present invention should not be confused with submerged screening operations with relatively horizontal screens nor with those in which a jet of liquid is forced through the screens at right angles thereto, either in the direction of screening or, as is sometimes done, in the reverse direction to backwash screens. Neither of these procedures is capable of giving the great advantages of the present invention because jets at right angles to a screen will not produce the scouring effect of the jet of turbulent air bubbles passing across the screen at a very flat angle. This is essential to the effective operation of the invention.

It is an additional advantage of the invention that cells can be constructed of sheet material which is a cheap construction and readily adaptable to the use of materials which resist the very serious corrosive effect of the strong acid solution in the leached pulp.

Another advantage of the invention is that although there is sufficient turbulence in the stream of bubbles passing across the screen surface to keep it clear and to prevent blinding, there is no mechanical grinding effect which would result in excessive comminution of the resin beads. This is an important practical advantage because the cost of ion exchange resin is a fairly important factor in the overall cost of the process and resin fines discharged with barren pulp contain uranium.

The present invention in its broadest aspect contemplates any operations in which the contact between resin and pulp is in a chamber separated from another chamber by a substantially vertical screen with the bubble layer passing thereover at a flat angle. However, in a more specific embodiment, a use of a series of cells presents the advantage that the cheap cell construction and the possibility of adjusting at will the time of contact between resin, and pulp in each cell permits adjusting the process to obtain maximum output with high uranium recovery from any leached pulp. The use of a series of cells therefore constitutes the preferred modification.

The invention will be illustrated in conjunction with the drawings in which.

Figures 1, 2:
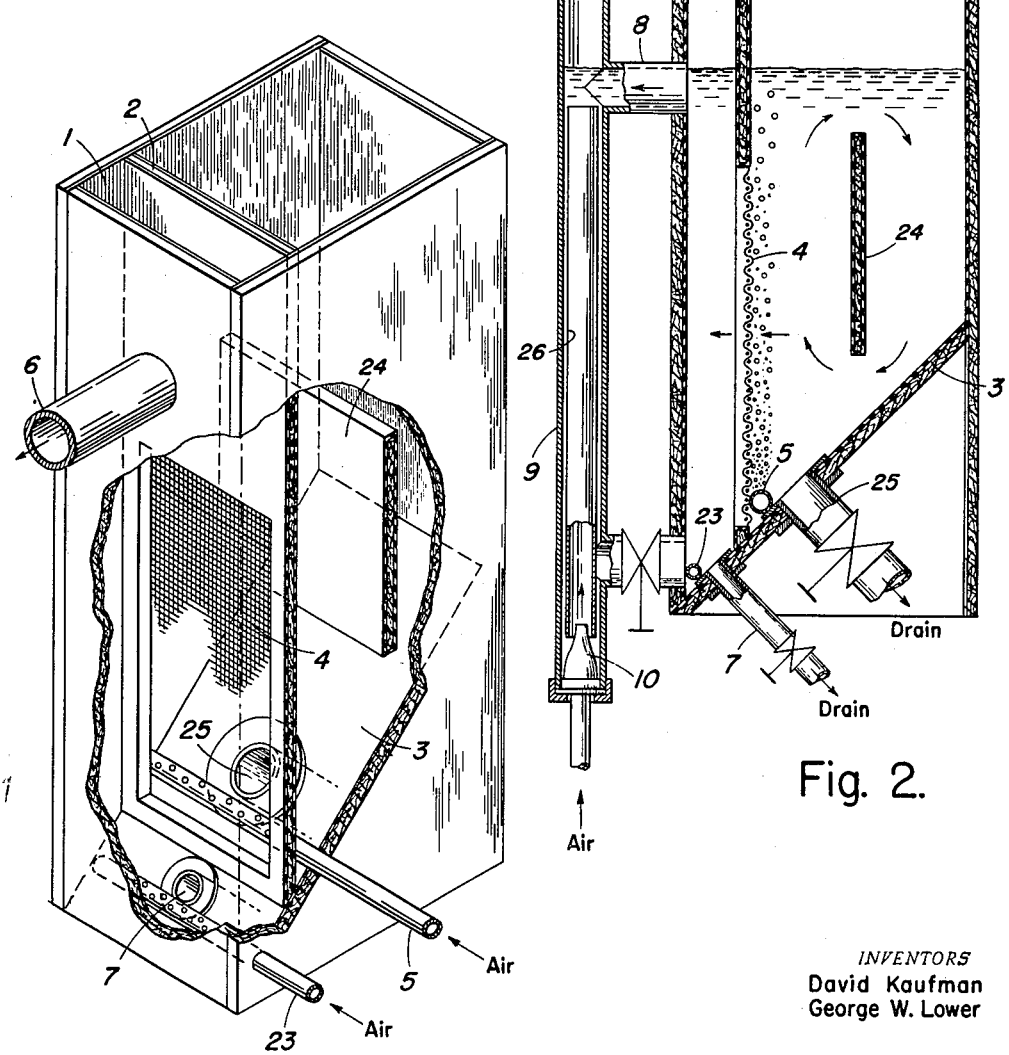
Fig. 1 is a perspective of a single cell.
Fig. 2 is a vertical section through a modified cell construction.

The cell in Fig. 1 is shown as provided with an outer chamber 1 in which an inner chamber is formed by the partition 2 and sloping bottom 3 provided with a valved drain 25. A vertical screen 4 is mounted in the partition 2, and a perforated pipe 5 at the bottom of screen 4 is connected to a source of compressed air (not shown). The second compartment of the cell is provided with an overflow pipe 6 and a drain plug 7. Agitation of the material in this compartment is provided by a perforated pipe 23 also connected to the source of compressed air. The circulation in the inner chamber is accelerated by a baffle 24.

In operation the pulp of a leached uranium ore, for example sulfuric acid-leached tailings from the cyanidation from South African gold ores, is introduced into the main chamber. The resin beads are likewise introduced into the main chamber, the screen being much finer, at least two mesh sizes, than the beads and much coarser, at least two mesh sizes, than the ore pulp particles. Compressed air is introduced through the perforated pipe 5, projecting a stream of bubbles vertically over the face of the screen 4. The stream of bubbles and the baffle 24 produce a steady but fairly gentle circulation of pulp and beads in the main compartment and at the same time scour the face of the screen 4 so that no blinding takes place. Some of the ore pulp solids together with the leach liquid flow through screen 4 into the second compartment and overflow through the overflow pipe 6. Agitation is provided by the perforated pipe 23.

The cell is normally connected in a string, and the average time of dwell in the various cells is determined by the rate of feed of leached pulp. It is adjusted so that the pulp overflowing from the last cell is substantially barren, the resin beads having fixed a maximum of complex uranium ion. The overflowing pulp from the last cell can go to waste or perferably can be subjected to suitable decantation or other procedures to recover the barren leach liquor, part or all of which may be reused in the leaching of the fresh portions of ore. The degree to which the leach liquor may be reused is not affected by the present invention and can follow standard practice.

Fig. 2 illustrates a modification of the cell in Fig. 1 in which like parts bear the same reference numerals. Instead of causing the pulp from the outer compartment 1 to overflow by gravity, it leaves the compartment through the opening 8 into an air lift 9 and a standpipe 26, which is shown as partly broken away. Air is introduced into the jet 10 and causes a mixture of bubbles and pulp to flow over the top of the air lift where a movable spout 11 journaled in a bearing 12 permits directing the flow of pulp or other liquid to another cell in series or to a suitable discharge launder. When it is desired to drain this cell, this can be done by opening the valve in a drain pipe 25 and 7. Continued operation of the air lift drains the cell. In normal operation when the flow of pulp to the air lift is through the pipe 8, the level in the cell is automatically maintained regardless of variations in output of the air lift.

Figure 3:
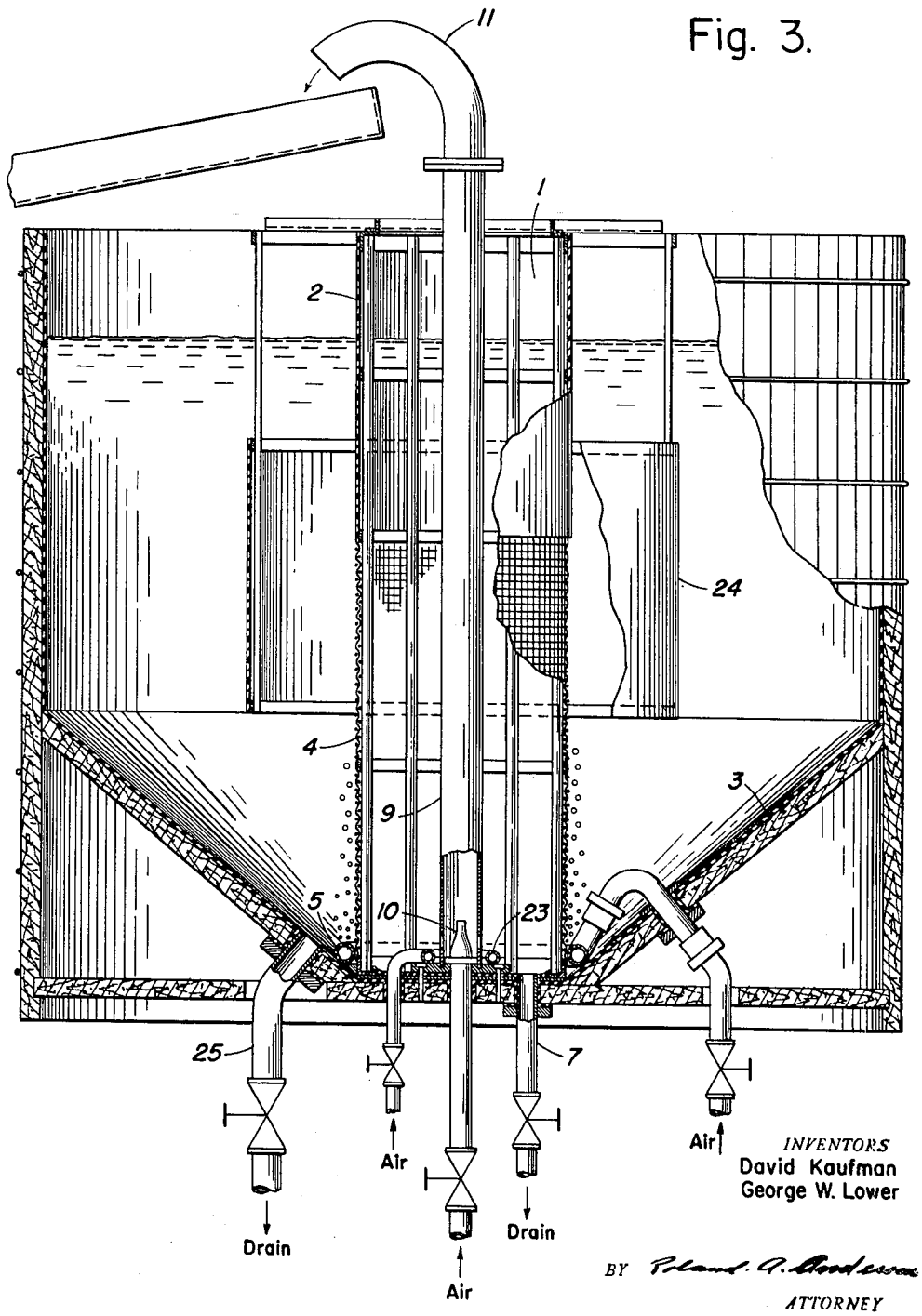
Fig. 3 is a vertical section through another form of cell.

Fig. 3 illustrates a different form of cell in which the same parts bear the same reference numerals. In this cell the screen 4 and baffle 24 are circular and the air lift 9 is placed in the center of the screen, pulp being fed into and resin being located in the annular outer compartment. This modification presents considerable advantage for very large cells, as the distance into which the pulp has to flow until it encounters the screen is more uniform; whereas in a cell of the type shown in Figs. 1 and 2, the screen is asymmetrically located, and in a large cell the difference in distance from the screen to various parts of the feed compartment is quite large. Another advantage in the design of cell shown in Fig. 3 is that it uses a standard cylindrical tank with a conical bottom which is a standard article of commerce and is usually built of wood staves in order to assure a cell construction which is capable of resisting the corrosive pulp and eluent. It is of course desirable in both the modification shown in Fig. 3 and that shown in Figs. 1 and 2 to apply an acid-proof coating to the cell walls. This may be bituminous, asphaltic or any other suitable acid-proof coating, such as for instance suitable acid-proof resin coatings.

Figure 6:
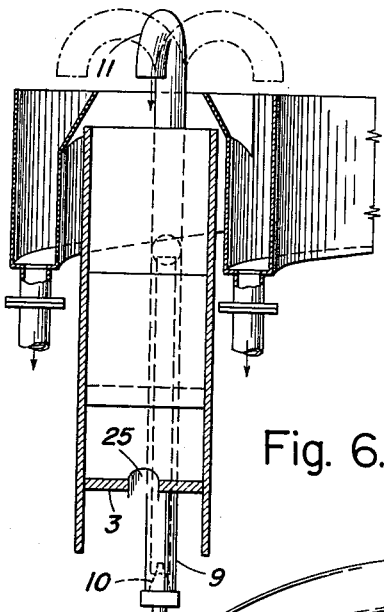
Fig. 6 is a section through one of the cells of Fig. 4 along the line 6—6.
Figure 7:
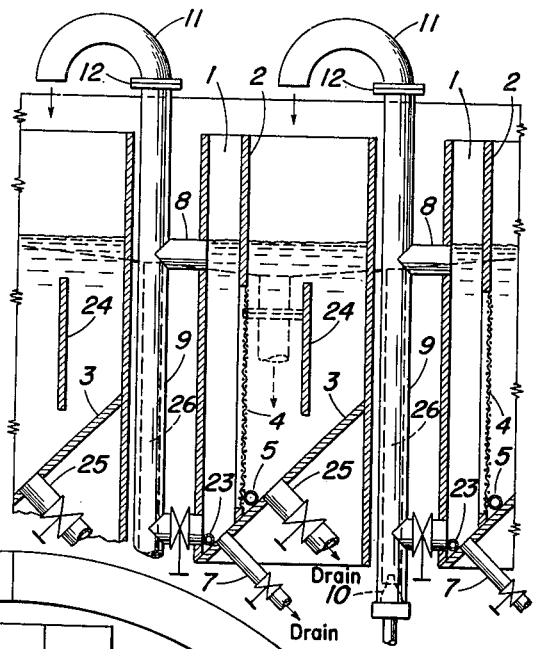
Fig. 7 is a section through a series of cells along the line 7—7 of Fig. 4.
Figure 5:
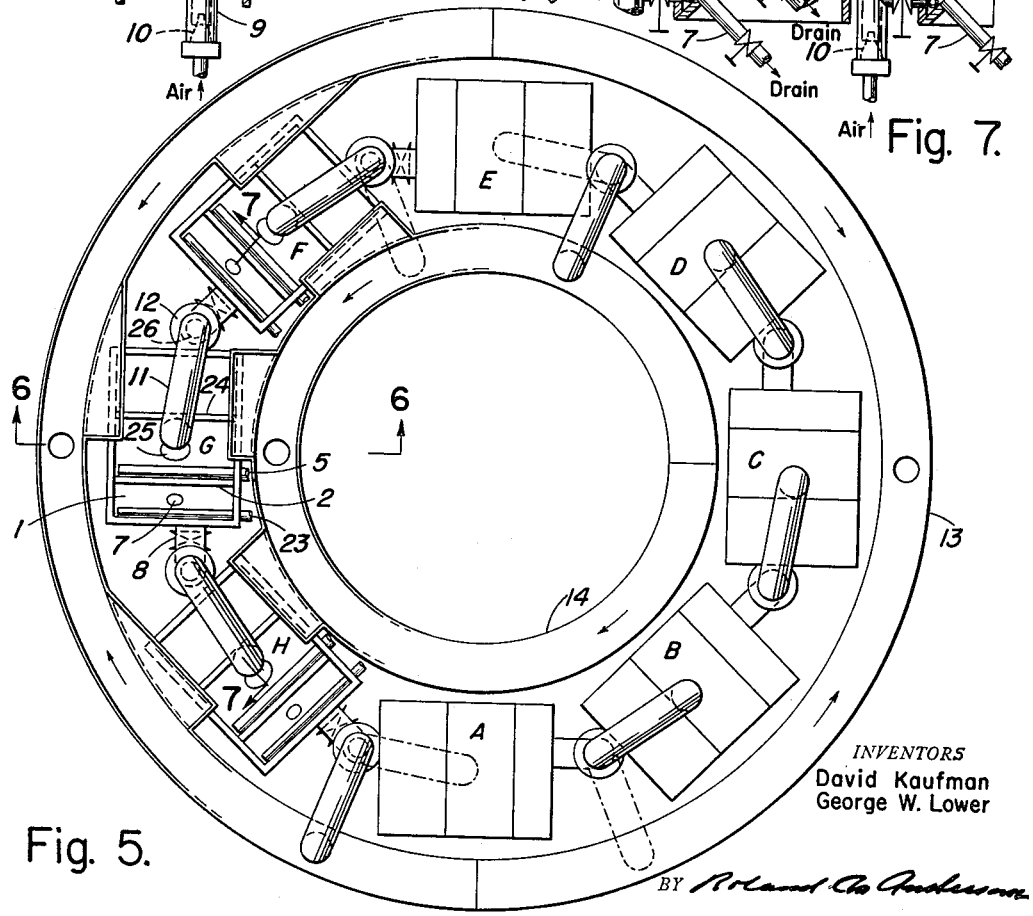
Fig. 5 is a diagrammatic illustration of a series of cells arranged for continuous operation.

As has been pointed out above, it is preferable to carry out leaching and elution in a continuous or semi-continuous manner. This is illustrated in Figs. 5 to 7 showing a series of cells having the modified structure which has been described in Fig. 2. The same parts bear the same reference numerals.

A series of eight cells are arranged in a circle as shown in Fig. 5 with two circular launders 13 and 14 on the outside and inside of the circle respectively. For clarity in describing the continuous operation, the cells are lettered from A to H counterclockwise around the circle. For simplicity, pipes for introducing pulp feed and eluting fluid are not shown, as these pipes are of conventional design and their particular construction forms no part of the present invention.

Beads of a strong base ion exchange resin are filled into the inner compartments of all eight cells. The beads are $+20$ mesh and the screens 4 are two mesh sizes smaller. Finely divided pulp from the sulfuric acid leaching of tailings from the cyanidation from South African gold ore is introduced into cell A. The air is turned on in the pipes 5 into the air lifts, thus agitating the beads and pulp and casing a continuous overflow through the air lift 9 into the inner compartment of cell B. The pulp passing through the screen into the outer compartment of the cell B is removed by the air lift and introduced into the inner compartment of cell C and the same is repeated with cell D. The movable curved spout 11 of the air lift from cell D, however, is turned so that it discharges the pulp into the waste launder 14. The air lifts and feed are adjusted so that the time of dwell in each cell is sufficient to result finally in discharging substantially barren pulp into the launder 14.

While the adsorption cycle is carried on to completion in cells A to D, cells E to H contain resin beads which have been charged with uranium from a previous cycle, cell H containing resin which has a maximum content of uranium complex, and cells G, F and E having successively lower uranium contents. Eluting fluid which may for example be a mixture of hydrochloric acid and ammonium chloride solutions is fed into cell E. As it passes through this cell in which beads are agitated by the compressed air from the pipe 5, it elutes a certain portion of the uranium, passing on through the screen into the air lift and thence into cell F, where the same procedure is repeated, the effluent passing on in turn to cell G and thence to cell H. The eluting liquid which has picked up as much uranium as is desired is then deirected by the curved spout 11 of the air lift of cell H into the outer launder 13 where the solution is passed to other equipment for recovery of its uranium content, for example for precipitation with ammonia and filtration. The liquid is then made up with hydrochloric acid and chlorides to a pH of about 1 and 1 $n$ chloride and is reused for elution.

When the cycle through cells A to D has been completed which is evidenced by a sharp increase in uranium content in the pulp discharged into the launder 14, cell A is cut out of the string and is washed with water. Then the spout on cell D is turned. The spout in the air lift of cell E is turned to discharge into the launder 14 as shown in dotted lines, and similarly the spouts on the air lifts for cells H and A are turned into the positions shown in dotted lines so that the discharge from H is into cell A and from cell A into the launder 13. Feed of acid-leached pulp is now introduced into cell B and eluting fluid into cell F. The adsorption and eluting cycles then proceed until the cells B to E can no longer adsorb the uranium complex to give the desired low uranium content in launder 14. Then the procedure is repeated so that the feed goes into the cell C, the discharge of barren pulp into launder 14 from cell F, the introduction of eluting fluid into cell G, and the discharge of eluting liquid from cell B into the launder 13. The adsorption and elution cycles then continue so that at all times there is adsorption going on and elution proceeds simultaneously except for a brief washing cycle in different cells. A maximum of utilization of equipment is thereby effected.

The continuous operation of the cells described in conjunction with Figs. 5 to 7 describes for simplicity an operation in which four cells are adsorbing, and four cells are being subjected to elution. In practical operation of sulfuric acid-leached desanded ore from the Colorado plateau, the adsorption cycle is a little slower than the elution cycle; and the following specific example is given for a continuous operation through ten cycles using a string of twelve cells distributed seven on adsorption and five on elution.

The pregnant acid-leached pulp contains an average of 0.8 gram per liter of $U_3O_8$. The flow rate is adjusted so that the residence is 12.5 minutes. The average uranium content of the barren pulp was 0.0033 gram per liter of $U_3O_8$. Elution was with a solution of 0.1N HCl and 0.9N $NH_4Cl$. Flow rate was slower than in the case of the pulp because a much smaller total volume of eluting solution can be used per cycle. The average for the ten cycles gave a 30-minute residence of the eluting solution in contact with the resin beads in the different cells. The pregnant eluent from the last cell contained 4.3 grams per liter of $U_3O_8$.

As has been described above, the cells can be used for adsorbing uranium from acid-leached pulp or from the acid-leached pregnant liquor when it has been separated from the pulp solids. The following example gives the result of ten cycles with leach liquor only. The pregnant liquor averaged 1 gram $U_3O_8$ per liter, the eluting solution which was the same as in the preceding example flowed through at a rate which gave 30 minutes' residence. Barren effluent from the seventh cell had a composition of 0.0014 gram per liter of $U_3O_8$.

Figure 4:
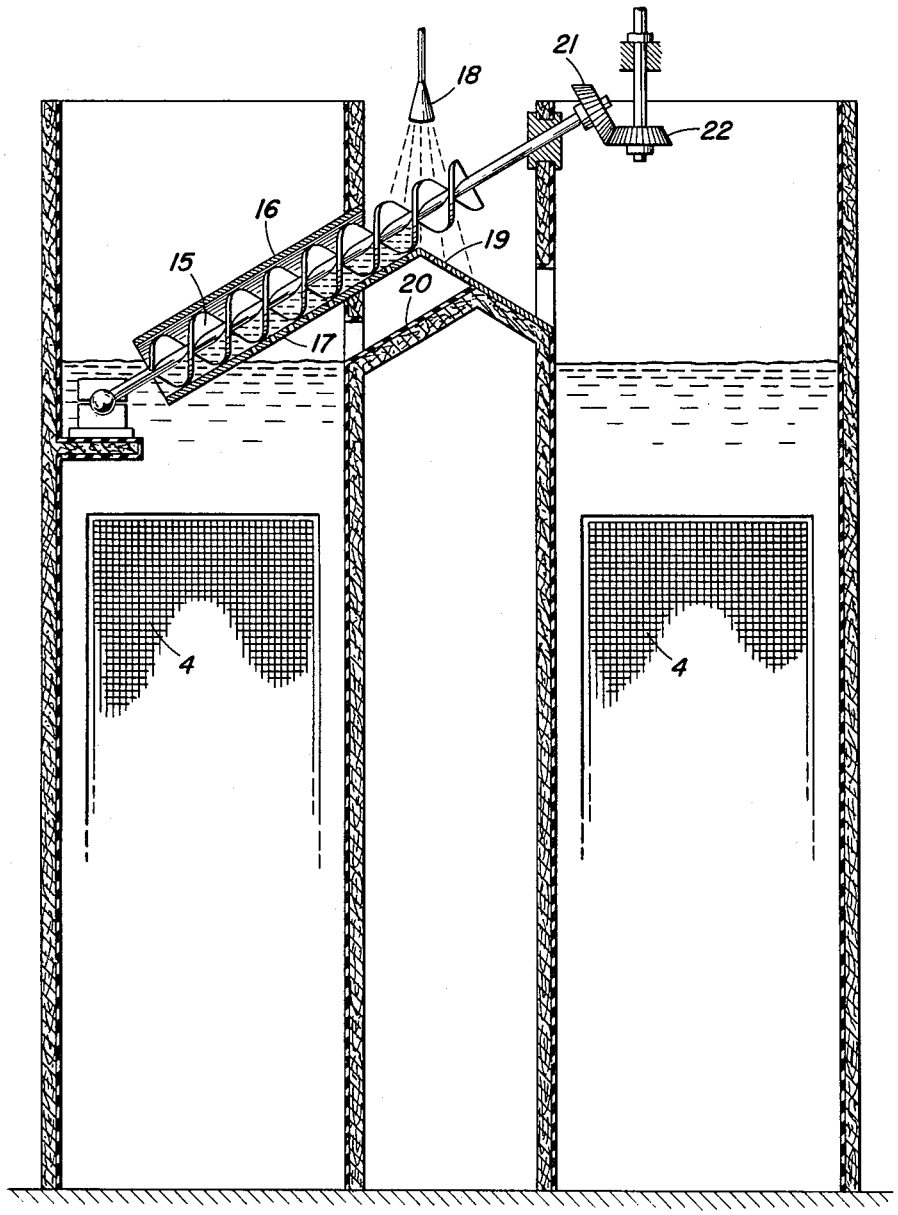
Fig. 4 is a section through a series of two cells of a string providing countercurrent flow of resin.

Fig. 4 illustrates two cells of the type shown in Fig. 2 arranged so that the air lift (not shown), of one cell always discharges into the inner compartment of the next cell. In other words, the journal 12 is eliminated. An Archimedes screw 15, operating in a cylinder 16 provided with a screen section 17 on its lower side dips into the surface of the pulp in the inner compartment. The screen size is the same as screen 4. The operation of the screw by means of beveled gears 21 and 22 continuously removes a portion of the resin solids which are too large to pass through the openings in the screen 7. The pulp, however, being sufficiently fine, drains through the screen openings back into the compartment. At the end of the screen the material is discharged into a screened chute 19 leading into the inner compartment of the preceding cell. A water spray 18 washes any adherent liquid from the resin beads, the washings passing into a trough 20 and flowing back into the cell.

In operation, therefore, a string of cells of the type described above permits the pulp to pass from one cell to another and at the same time removes a portion of the resin beads in each cell and passes them back to the preceding cell so that a countercurrent movement of beads and pulp results. Resin from the first cell of the string used for the adsorption cycle is fed into the last cell of a string in the elution cycle, eluting liquid, of course, being introduced into the first cell of this string and removed from the last in the same manner as is described in connection with Fig. 5. The resin from the first adsorption cell which has the highest uranium content is being introduced into the last cell of the eluting string where it encounters the most highly charged eluting liquid. Resin from the first cell of the elution string after washing is dropped onto a conveyor (not shown) and returned to the last cell of the adsorption cycle, thus completing the circuit for flow of resin.

When a separate conveying mechanism is used to return resin from the first cell of the elution string to the last cell of the adsorption string, the physical arrangement of the cells can be in any suitable shape so long as the feed compartments of the cells are sufficiently close to each other so that the resin conveying means will carry the resin from one cell to the other. This is of advantage in pilot plants or wherever changes are to be made from time to time. However, since the maximum advantage of the countercurrent resin flow is obtained in fixed set ups, it is sometimes advantageous to arrange the cells in a circle or closed figure similar to that shown in Fig. 5 for the other type of continuous operation. When this is done, the feed compartment of the first cell of the elution string is adjacent to the feed compartment of the last cell of the adsorption string, so that a simple screw conveyor as shown in Fig. 4 completes the closed circuit for the resin.

The modification of cell described in Fig. 4 presents several advantages. In the first place no supervision is required because the introduction of leached pulp and eluent and the removal of barren pulp and pregnant eluent is always from the same cell and does not have to be changed periodically as resin becomes fully charged or fully eluted. The flow of resin is maintained constant by a constant speed of the screws, or if a different type of mechanical device is used for removing resin beads by a uniform movement of this device, the operation is entirely continuous and eliminates a maximum of supervisory labor. The cost of the cells with resin-moving device is somewhat higher than the type of cell shown in Fig. 2 but in large operations, this additional cost is more than offset by the saving in labor.

The continuous method effects a saving in resin, as the cells are in continuous operation, whereas in the modification described in Figs. 5–7, it is necessary to drain the cell taken out of the string and to wash the resin. This change-over time lengthens the cycle unless additional cells are provided. As a result a larger amount of resin is required, or the same amount of resin needs a longer cycle, and hence the output per unit volume of resin per unit of time is decreased.

We claim:

1. A method of recovering dissolved uranium compounds from acid leach liquors which comprises contacting the liquor with ion exchange material capable of fixing uranium compounds in the form of complex ions in one zone causing flow through a screen having a predominantly vertical component and openings at least two mesh sizes finer than the particle size of ion exchange material and causing a turbulent layer of gas and liquid bubbles to pass across the screen sufficient to prevent blinding of the screen whereby uninterrupted screening and circulation within the zone is effected.

2. A process according to claim 1 in which the ion exchange material is contacted with acid-leached ore pulp without separating the leach liquor therefrom, the particle size of the ore solids being much finer than the particle size of the ion exchange material and at least two mesh sizes finer than the screen opening.

3. A process according to claim 2 in which there are a plurality of contact zones containing ion exchange material and screens, the acid-leached pulp being introduced into the zone at one end of the series and relatively barren ore pulp being removed from the other end of the series.

4. A process according to claim 3 in which the first contact zone of the series, when a predetermined maximum of uranium has been fixed, is cut off from the series and a zone containing relatively fresh ion exchange material cut in at the end of the series, the feed of acid-leached pulp being transferred to the second zone of the original series and the cycle repeated.

5. A process according to claim 4 in which the ion exchange material in the zones which has become charged with uranium is subjected, without removal, to countercurrent elution by introduction of an eluting solution into one end of the series of zones, and the elution carried out until the ion exchange material in the zone where the eluting solution is first introduced has been eluted to a predetermined degree, cutting this zone out of the series, and introducing a zone with ion exchange material having a maximum of fixed uranium at the other end of the series and repeating the cycle.

6. A process according to claim 1 in which a plurality of the contact zones containing ion exchange material are provided, the acid-leached pulp being introduced into the zone at one end of the series and relatively barren pulp being removed from the one end of the series and portions of the ion exchange material are removed, separated from adhering pulp solids and liquids and introduced into the preceding contact zone; the ion exchange material from the first zone being introduced into the last zone of a second cell through which eluting liquid flows countercurrent to the flow of ion exchange material and the resin from the first zone or the eluting series is introduced into the last zone of the series in which the pulp is contacted with the ion exchange material.

7. A process according to claim 6 in which the ion exchange material removed from each zone is moved over a screen of comparable size to the screen separating zones and positioned over the zone from which the ion exchange material is removed and whereby pulp solids are drained off from the ion exchange material particles and these particles after removal from the zone are washed and the washing returned to the zone.

No references cited.